United States Patent
Aleshin et al.

(10) Patent No.: US 10,446,277 B2
(45) Date of Patent: Oct. 15, 2019

(54) FUEL ASSEMBLY WITH AN EXTERNAL DASHPOT DISPOSED AROUND A GUIDE TUBE PORTION

(71) Applicant: WESTINGHOUSE ELECTRIC COMPANY, LLC, Cranberry Township, PA (US)

(72) Inventors: Yuriy Aleshin, Cayce, SC (US); Brian Millare, Columbia, SC (US); Michael O. Bausch, Lexington, SC (US); Carter Eliot Lunde, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 196 days.

(21) Appl. No.: 15/404,477

(22) Filed: Jan. 12, 2017

(65) Prior Publication Data

US 2018/0197640 A1    Jul. 12, 2018

(51) Int. Cl.
| | |
|---|---|
| *G21C 3/332* | (2006.01) |
| *G21C 3/26* | (2006.01) |
| *G21C 7/20* | (2006.01) |
| *G21C 3/326* | (2006.01) |
| *G21C 3/334* | (2006.01) |
| *G21C 7/12* | (2006.01) |

(Continued)

(52) U.S. Cl.
CPC ............... *G21C 3/332* (2013.01); *G21C 3/26* (2013.01); *G21C 3/326* (2013.01); *G21C 3/334* (2013.01); *G21C 7/12* (2013.01); *G21C 7/20* (2013.01); *G21C 9/02* (2013.01); *G21C 3/322* (2013.01); *G21C 3/3267* (2019.01); *G21C 3/3305* (2013.01); *G21C 3/34* (2013.01); *G21C 7/117* (2013.01); *Y02E 30/38* (2013.01); *Y02E 30/39* (2013.01)

(58) Field of Classification Search
CPC .......... G21C 3/332; G21C 7/20; G21C 3/322; G21C 3/26; G21C 3/326; G21C 3/334; G21C 7/12; G21C 9/02
USPC .................................................. 376/234, 449
See application file for complete search history.

(56) References Cited

U.S. PATENT DOCUMENTS

| | | | | |
|---|---|---|---|---|
| 4,655,990 A * | 4/1987 | Leclercq | ............ | G21C 7/20 376/446 |
| 4,769,208 A * | 9/1988 | Germer | ............ | G21C 9/02 376/336 |

(Continued)

OTHER PUBLICATIONS

International Search Report and Written Opinion of the International Searching Authority dated Apr. 19, 2018 for PCT/US2017/064175 (Forms PCT/ISA/220, PCT/ISA/210, PCT/ISA/237).

*Primary Examiner* — Jack W Keith
*Assistant Examiner* — Daniel Wasil
(74) *Attorney, Agent, or Firm* — Eckert Seamans Cherin & Mellott, LLC (57) ABSTRACT

A nuclear fuel assembly comprising a plurality of control rod guide assemblies. At least one of the control rod guide assemblies includes a guide tube having an axial dimension, the guide tube being supported by the plurality of grids and extending axially between the top nozzle and the bottom nozzle, the guide tube having an upper portion having a first radius and a lower portion having a second radius less than the first radius, and an external dashpot tube disposed around a portion of the lower portion in an area beginning at the bottom grid and extending toward the top nozzle.

7 Claims, 6 Drawing Sheets

(51) Int. Cl.
   *G21C 9/02* (2006.01)
   *G21C 3/34* (2006.01)
   *G21C 3/322* (2006.01)
   *G21C 3/33* (2006.01)
   *G21C 7/117* (2006.01)

(56) References Cited

U.S. PATENT DOCUMENTS

| | | | | |
|---|---|---|---|---|
| 4,826,648 | A | * | 5/1989 | Savary .................... G21C 7/20 376/225 |
| 5,068,083 | A | | 11/1991 | John, Jr. et al. |
| 6,246,741 | B1 | | 6/2001 | Nunokawa et al. |
| 7,515,674 | B2 | | 4/2009 | Sparrow et al. |
| 7,668,284 | B2 | | 2/2010 | Sparrow et al. |
| 2008/0084957 | A1 | | 4/2008 | Aleshin et al. |
| 2008/0137798 | A1 | | 6/2008 | Sparrow et al. |
| 2009/0046824 | A1 | | 2/2009 | Pomirleanu et al. |
| 2011/0182396 | A1 | | 7/2011 | Park et al. |
| 2016/0093407 | A1 | * | 3/2016 | Liu .......................... G21C 7/20 376/449 |

* cited by examiner

FUEL ASSEMBLY WITH AN EXTERNAL DASHPOT DISPOSED AROUND A GUIDE TUBE PORTION

BACKGROUND

1. Field

The disclosed concept pertains generally to nuclear reactors and, more particularly, to nuclear assemblies that employ guide thimbles with enhanced stiffness in the dashpot region.

2. Related Art

In most water cooled nuclear reactors, the reactor core is comprised of a large number of elongated fuel assemblies. In pressurized water nuclear reactors (PWR), these fuel assemblies typically include a plurality of fuel rods held in an organized array by a plurality of grids spaced axially along the fuel assembly length and attached to a plurality of elongated thimble tubes of the fuel assembly. The thimble tubes typically receive control rods or instrumentation therein. Top and bottom nozzles are on opposite ends of the fuel assembly and are secure to the ends of the thimble tubes that extend above and below the ends of the fuel rods.

When the control rods scram, they freefall and can impact the bottom nozzle at a high velocity, potentially causing damage to components of the nuclear reactor. In a standard fuel assembly design, approximately two feet before full insertion of the control rods into the fuel assembly, the tips of the control rods enter a small portion of the thimble tube called the dashpot. The diameter of the dashpot is approximately one millimeter larger than the control rods. Because the control rods are moving very fast at this point in the scram, there is a large volume of water which has to be accelerated up past the falling rods to make room for them in the dashpot. This process causes the control rods to decelerate rapidly, thus lessening the impact velocity of the falling control rod.

Incomplete rod insertion (IRI) events are problematic in nuclear reactors. An IRI event occurs when the control rod cannot be completely inserted through the thimble tube. One of the primary causes of an IRI event is a distortion in the fuel assembly and the thimble tube. The distortion is most critical in the dashpot area of the thimble tube where the clearance between the control rod and the inner surface of the thimble tube is minimal. A lack of stiffness in the dashpot region of the thimble tube can cause the thimble tube to be susceptible to distortion and increase the chance of an IRI event occurring.

There is a need to improve the stiffness of the dashpot region of thimble tubes. However, there is also a need to minimize the number of parts and assembly steps of fuel assemblies.

SUMMARY

In accordance with an embodiment of this concept, a nuclear fuel assembly comprises: a top nozzle; a bottom nozzle; a plurality of grids arranged in between the top nozzle and the bottom nozzle and supporting the guide tubes in the spaced parallel array at spaced axial elevations between the top nozzle and bottom nozzle, the plurality of grids including a bottom grid disposed closest to the bottom nozzle among the plurality of grids; and a plurality of control rod guide assemblies. At least one of the control rod guide assemblies includes: a guide tube having an axial dimension, the guide tube being supported by the plurality of grids and extending axially between the top nozzle and the bottom nozzle, the guide tube having an upper portion having a first radius and a lower portion having a second radius less than the first radius; and an external dashpot tube disposed around a portion of the lower portion in an area beginning at the bottom grid and extending toward the top nozzle. These and other objects are satisfied by a holding fixture for assisting in assembly of a support grid for nuclear fuel rods and including a plurality of straps each having a plurality of slots extending approximately half a height of the straps and tabs formed beside or between the slots.

In accordance with another embodiment of the concept, a control rod guide assembly for use with a nuclear reactor fuel assembly including a top nozzle, a bottom nozzle, and a plurality of grids comprises: a guide tube having an axial dimension, the guide tube being supported by the plurality of grids and extending axially between the top nozzle and the bottom nozzle, the guide tube having an upper portion having a first radius and a lower portion having a second radius less than the first radius; and an external dashpot tubes disposed around a portion of the lower portion in an area beginning at the bottom grid and extending toward the top nozzle.

In accordance with another embodiment of the disclosed concept, a method of installing a control rod guide assembly in a nuclear reactor fuel assembly including a top nozzle, a bottom nozzle, and a plurality of grids comprises: providing a guide tube and an external dashpot tube; inserting the guide tube into a skeleton of the nuclear reactor fuel assembly to a lower middle grid, the lower middle grid being second closest to the bottom nozzle of the plurality of grids; installing the external dashpot tube over the guide tube; continue inserting the guide tube into the skeleton to the bottom nozzle; attaching the guide tube to the skeleton; and bulging the guide tube onto the external dashpot tube.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
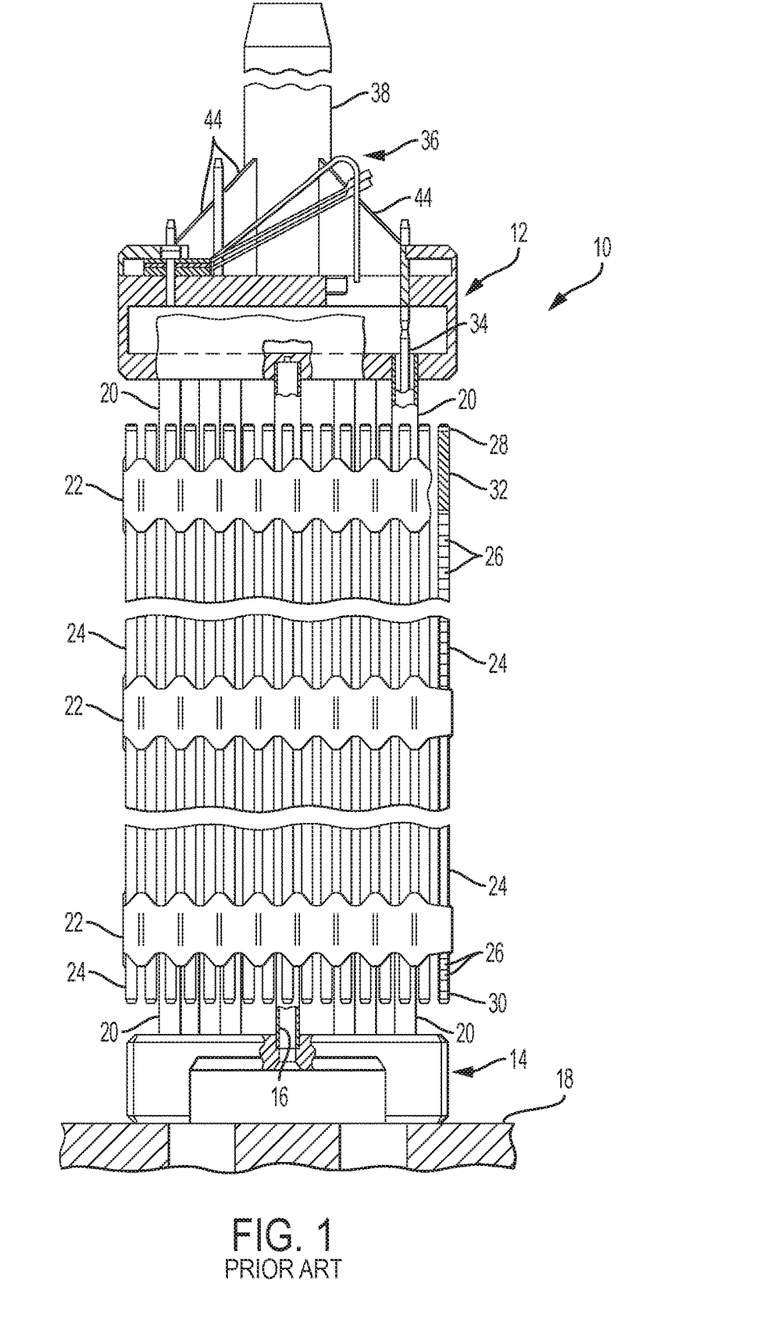
FIG. 1 is a side sectional view partially in section of a fuel assembly with guide thimbles that can incorporate the disclosed concept.

FIG. 1 illustrates a typical nuclear fuel assembly 10 for a pressurized water reactor that can employ control rod guide assemblies in accordance with embodiments of the disclosed concept to slow down the control rods when they are dropped into the reactor core under a scram condition. FIG. 1 shows a side sectional view of a nuclear reactor fuel assembly, represented in vertically shortened form and being generally designated by reference character 10. The fuel assembly 10 has a structural skeleton which, at its lower end includes a bottom nozzle 14. The bottom nozzle 14 supports the fuel assembly 10 on a lower core support plate 18 in the core region of the nuclear reactor (not shown). In addition to the bottom nozzle 14, the structural skeleton of the fuel assembly 10 also includes a top nozzle 12 at its upper end and a number of guide tubes or thimbles 20, which extend longitudinally between the bottom and top nozzles 14 and 12 and at the opposite ends are rigidly attached thereto.

The structural skeleton of the fuel assembly 10 further includes a plurality of traverse grids 22 that are axially spaced along, and mounted to, the guide tubes 20. In the final assembly the grids function to maintain an organized array of elongated fuel rods 24 traversely spaced and supported by the grids 22. Also, the structural skeleton of the fuel assembly 10 includes an instrumentation tube 16 located in the center thereof, which extends and is captured between the bottom and top nozzles 14 and 12. With such an arrangement of parts, the fuel assembly 10 forms an integral unit capable of being conveniently handled without damaging the assembled parts.

The fuel rods 24 are not actually part of the structural skeleton of the fuel assembly 10, but are inserted, respectively, in the individual cells within the grids 22 before the top nozzle is finally affixed at the end of fuel assembly manufacture. As mentioned above, the fuel rods 24, as in the array shown in the fuel assembly 10, are held in space relationship with one another by the grids 22 spaced in tandem along the fuel assembly length. Each fuel rod 24 includes a stack of nuclear fuel pellets 26 and is closed at its opposite ends by upper and lower fuel rod end plugs 28 and 30. The pellets 26 are maintained in the stack by plenum spring 32 disposed between the upper end plug 28 and the top of the pellet stack. The fuel pellets 26, composed of fissile material, are responsible for creating the thermal power of the reactor. A liquid moderator/coolant such as water or water containing boron, is pumped upwardly through a plurality of flow openings in the lower core support plate 18 to the fuel assembly 10. The bottom nozzle 14 of the fuel assembly 10 passes the coolant upwardly through the guide tubes 20 and along the fuel rods 24 of the assembly 10 in order to extract heat generated therein for the production of useful work. For the purpose of illustration, FIG. 1 shows a 17×17 array of fuel rods 24 in a square configuration, it should be appreciated that other arrays of different designs and geometries are employed in various models of pressurized reactors.

To control the fission process, a number of control rods 34 are reciprocally movable in the guide tubes 20 located at predetermined positions in the fuel assembly 10. A rod cluster control mechanism 36 positioned above the top nozzle 12 supports the control rod 34. The control mechanism has an internally threaded cylindrical member 38 which functions as a drive rod with a plurality of radial extending flukes or arms 44. Each arm 44 is interconnected to a control rod 34 such that the control rod mechanism 36 is operable to move the control rods vertically in the guide tubes 20 to thereby control the fission process in the fuel assembly 10, all in a well-known manner.

The grids 22 are mechanically attached to the control rod guide thimbles 20 and the instrumentation tube 16 by welding, or preferably by bulging. Bulging is particularly desirable where welding dissimilar materials is difficult.

Figure 2:
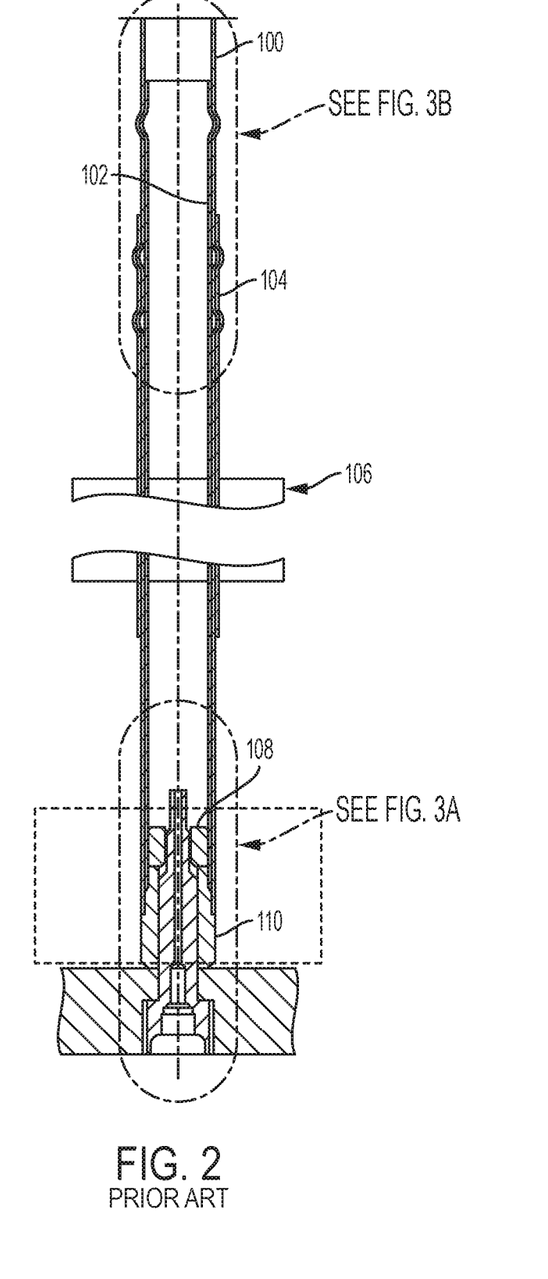
FIG. 2 is a side sectional view of a typical control rod guide assembly with a tube-in-tube (TnT) dashpot.
Figure 3A:
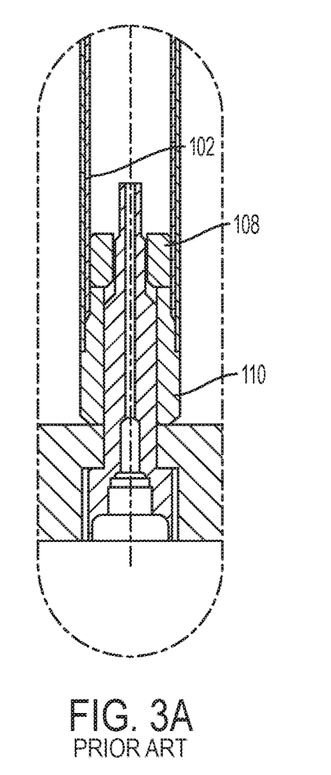
FIG. 3A is a side sectional view of a lower portion of the TnT dashpot region of the control rod guide assembly of FIG. 2.
Figure 3B:
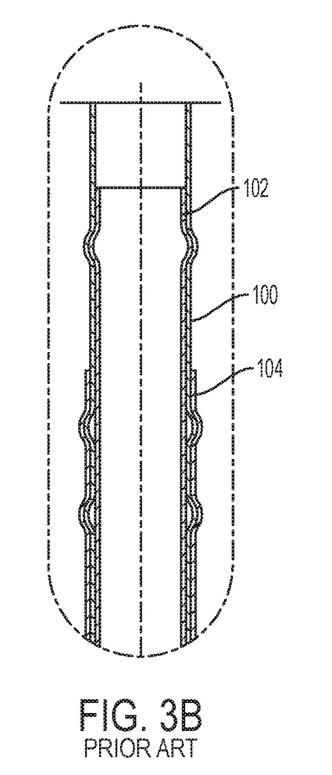
FIG. 3B is a side sectional view in section of an upper portion of the TnT dashpot region of the control rod guide assembly of FIG. 2.

FIG. 2 is a side sectional view in section of a typical control rod guide assembly including a TnT dashpot region, FIG. 3A is a side sectional view of a lower portion of the TnT dashpot region of the control rod guide assembly of FIG. 2, and FIG. 3B is a side sectional view in section of an upper portion of the TnT dashpot region of the control rod guide assembly of FIG. 2. The control rod guide thimble assembly includes a guide tube 100, an internal dashpot tube 102, and a bottom grid sleeve 104. The control rod guide assembly also includes an internal dashpot tube end plug 108 and a guide tube end plug 110. In the completed control rod guide assembly, the internal dashpot tube 102 is disposed inside the guide tube 100 and reduces the internal diameter of the guide tube 100 in the dashpot region in order to provide the dashpot functionality.

Forming and installing the control rod guide assembly into a fuel assembly requires numerous steps. The bottom grid sleeve 104 is welded onto the bottom grid 106 of the fuel assembly. Then, two weld operations are performed to assemble guide tube 100 and the internal dashpot tube 102. Next, the guide tube 100 is inserted into the skeleton of the fuel assembly with tooling screws and bulged onto the bottom grid sleeve 104. Next, the internal dashpot tube 102 is inserted into the guide tube 100 using a second set of tooling screws and the internal dashpot tube 102 is bulged onto the guide tube 100. The insertions of the guide tube 100 and the internal dashpot tube 102 each require tooling screws to be inserted and then removed from the guide tube 100 and internal dashpot tube 102, respectively. Similarly, each bulging operation requires bulging tools to be inserted and then removed. Each step of the manufacturing process adds to the amount of time required to manufacture and install the control rod guide assembly. Additionally, each part of the control rod guide assembly adds to its cost.

The TnT dashpot region of the control rod guide assembly enhances the stiffness of the dashpot region. However, as described above, there are numerous steps required to manufacture and install this type of control rod guide assembly in a fuel assembly.

Figure 4:
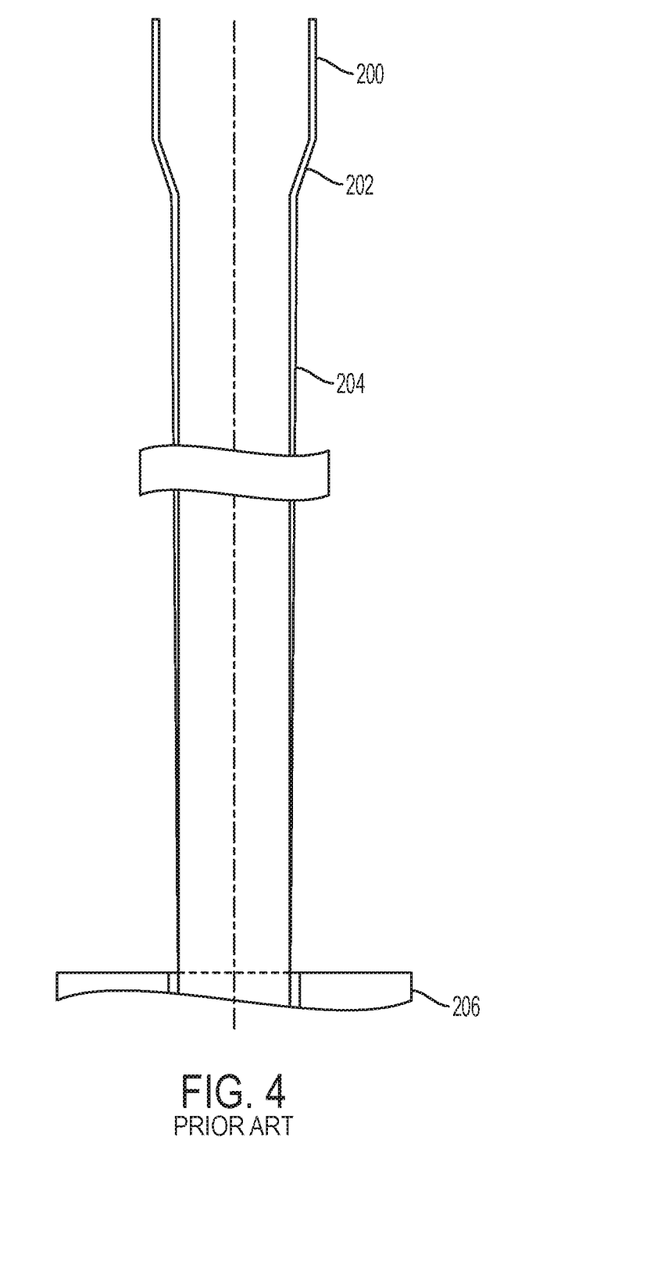
FIG. 4 is a side sectional view in section of a typical pushpoint type control rod guide assembly.

FIG. 4 is a side sectional view in section of a typical pushpoint type control rod guide assembly. The pushpoint control rod guide assembly includes an upper portion 200, a transitional portion 202, and a lower portion 204. The lower portion 204 has an internal radius that is less than the upper portion 200. The transitional portion 202 connects the upper portion 200 and the lower portion 204 and transitions in radius from the greater radius of the upper portion 200 to the lesser radius of the lower portion 204.

The lower portion 204 is formed in a dashpot region of the control rod guide assembly that begins above a bottom grid 206 and extends below the bottom grid 206. The reduced radius of the lower portion 204 provides the dashpot functionality of the control rod guide assembly. The control rod guide assembly of FIG. 4 requires fewer manufacturing steps and parts compared to the control rod guide assembly of FIG. 2. However, the control rod guide assembly of FIG. 4 is more susceptible to a lack of stiffness in the dashpot region that the control rod guide assembly of FIG. 2.

Figure 5:
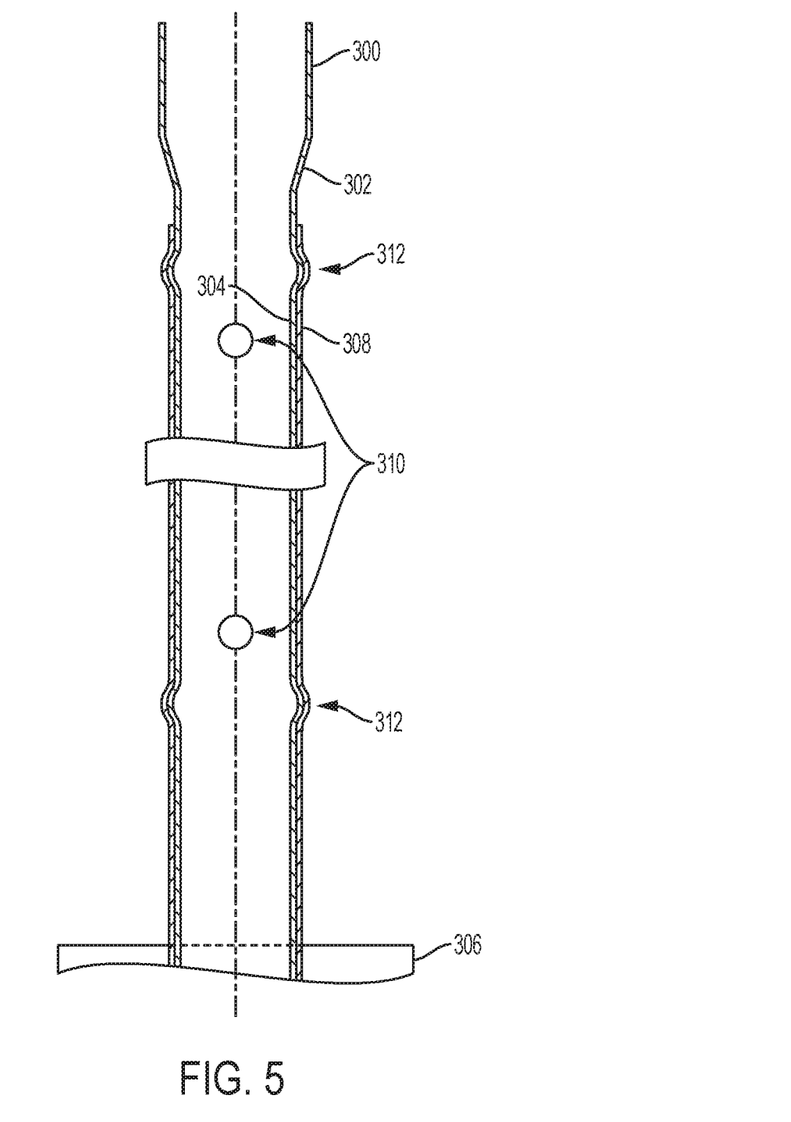
FIG. 5 is a side sectional view in section of a control rod guide assembly in accordance with an example embodiment of the disclosed concept.

FIG. 5 is a side sectional view in section of a control rod guide assembly in accordance with an example embodiment of the disclosed concept. The control rod guide assembly of FIG. 5 provides enhanced stiffness in the dashpot region compared to the pushpoint type control rod guide assembly of FIG. 4 while requiring fewer manufacturing steps and parts compared to the control rod guide assembly with the TnT dashpot region of FIG. 2. The control rod guide assembly of FIG. 5 may be employed, for example, in conjunction with the fuel assembly 10 of FIG. 1 or with any other suitable type of fuel assembly for a nuclear reactor.

The control rod guide thimble assembly includes guide tube having an upper portion 300, a transitional portion 302, and a lower portion 304. The lower portion 304 has a lesser radius than the upper portion 300 and the transitional portion 302 connects the upper and lower portions similar to the pushpoint type control rod guide assembly. The lower portion 304 is formed in a dashpot region of the control rod guide assembly that begins above a bottom grid 306 and extends below the bottom grid 306. The bottom grid 306 may be, for example, the lower most grid 22 of the fuel assembly 10 of FIG. 1. The reduced radius of the lower portion 304 provides the dashpot functionality of the control rod guide assembly. The guide tube of the control rod guide assembly of FIG. 5 is similar to the pushpoint type control rod guide assembly of FIG. 4. However, the control rod guide thimble assembly in accordance with example embodiments of the disclosed concept further includes an external tube 308.

The external tube 308 is disposed around the bottom portion 304 of the guide tube. The external tube 308 is formed in the dashpot region above bottom grid 306. The external tube 308 provides enhanced stiffness to the dashpot region without affecting the internal diameter of the lower portion 304 of the guide tube. The external tube 308 also includes one or more weep holes 310 formed therein. The weep holes 310 help with potential thermal hydraulic concerns such as reducing the chance that boiling occurs in the annular region between the lower portion 304 of the guide tube and the external tube 308.

The external tube 308 is attached to the lower portion 304 of the guide tube by bulging the guide tube onto the external tube 308. As a result of the bulging, bulges 312 are formed in the guide tube and the external tube 308. In some example embodiments of the disclosed concept one bulge is formed in an upper half of the external tube 308 and one bulge is formed in the lower half of the external tube 308. However, it will be appreciated that any number of bulges may be formed at any number of locations along the external tube 308 without departing from the scope of the disclosed concept.

In some example embodiments of the disclosed concept, two weep holes 310 are formed in the external tube 308, one in an upper half of the external tube 308 and one in the lower half of the external tube 308. Additionally, in some example embodiments of the disclosed concept, the weep holes 310 are formed in the external tube 308 between the bulges 312. However, it will be appreciated by those having ordinary skill in the art that any number of weep holes 310 may be formed at any number of locations in the external tube 308 without departing from the scope of the disclosed concept.

In some example embodiments of the disclosed concept, the lower portion 312 of the guide tube and the external tube 308 are substantially cylindrical. A substantially cylindrical object may have bulges and weep holes formed in it and still be considered substantially cylindrical. It will be appreciated by those having ordinary skill in the art that the lower portion 312 of the guide tube and the external tube 308 may have different shapes without departing from the scope of the disclosed concept.

The control rod guide assembly of FIG. 5 with the external tube 308 provides enhanced stiffness compared to the control rod guide assemblies of FIGS. 2 and 4. Table 1 shows test results comparing the lateral stiffness in the dashpot region of the a control rod guide assembly with a TnT dashpot region (FIG. 2), a pushpoint type control rod guide assembly (FIG. 4), and a control rod guide assembly including an external tube (FIG. 5).

TABLE 1

| Description | Average Lateral Stiffness at .25 Inch Deflection (lb/in) | | |
|---|---|---|---|
| | 0 Deg | 90 Deg | Benefit |
| 17 OFA Pushpoint Type Control Rod Guide Assembly | 85 | 86 | 70% |
| 17 OFA Control Rod Guide Assembly With External Tube | 147 | 144 | |
| 17 RFA Pushpoint Type Control Rod Guide Assembly | 102 | 100 | 48% |
| 17 RFA Control Rod Guide Assembly With External Tube | 150 | 149 | |
| 17 RFA Control Rod Guide Assembly With TnT Dashpot Region | 122 | 130 | 25% |

As shown in Table 1, the control rod guide assembly with the external tube 308 provides enhanced stiffness over the control rod guide assembly with the TnT dashpot region and the pushpoint type control rod guide assembly. Additionally, the control rod guide assembly with the external tube 308 uses less parts that the control rod guide assembly with the TnT dashpot region at least because it only has one guide tube end plug rather than the guide tube end plug 110 and the internal dashpot tube end plug 108. Moreover, the control rod guide assembly with the external tube 308 requires less operations to install than the control rod guide assembly with the TnT dashpot region.

Figure 6:
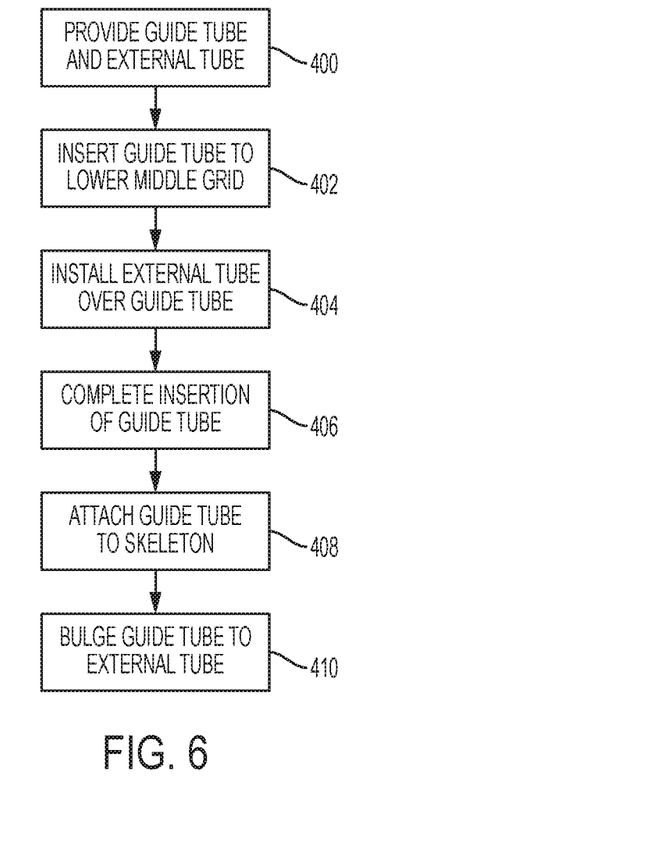
FIG. 6 is a flowchart of a method of installing a control rod guide assembly in accordance with an example embodiment of the disclosed concept.

FIG. 6 is a flowchart of a method of installing the control rod guide assembly of FIG. 5 in accordance with an example embodiment of the disclosed concept. The process begins at 400 where the guide tube and the external tube 308 are provided. The guide tube and external tube 308 may be for example, the guide tube and external tube 308 shown in FIG. 4. At 402, the guide tube is inserted into the skeleton of a nuclear reactor assembly, such as the nuclear reactor assembly shown in FIG. 1, to the lower middle grid of the nuclear reactor fuel assembly. The lower middle grid is the second closest grid to the bottom nozzle of the nuclear reactor fuel assembly.

Next, at 404 the external tube 308 is installed on the guide tube. The external tube 308 may be installed by sliding it over the guide tube. At 406, insertion of the guide tube is completed, for example, by continuing to insert the guide tube into the skeleton to the bottom nozzle. Then, at 408, the guide tube is attached to the skeleton. The guide tube may be attached to the skeleton in any suitable manner such as, without limitation, using a thimble screw to hold it in place. Finally, at 410, the guide tube is bulged onto the external tube 308.

The process of installing the control rod guide assembly shown in FIG. 6 requires less steps than the process required to install the control rod guide assembly with the TnT dashpot region. For example, the process of FIG. 6 only requires one bulge operation. In contrast, the process to install the control rod guide assembly with the TnT dashpot region requires separate bulge operations that each require insertion and removal of bulging tools and adding to the time required to complete installation. Moreover, the resultant installed control rod guide assembly provides enhanced stiffness over the control rod guide assembly with the TnT dashpot region or the pushpoint type control rod guide assembly.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly comprising:
    a top nozzle;
    a bottom nozzle;
    a plurality of grids arranged in between the top nozzle and the bottom nozzle at spaced axial elevations between the top nozzle and bottom nozzle, the plurality of grids including a bottom grid disposed closest to the bottom nozzle among the plurality of grids; and
    a plurality of control rod guide assemblies, at least one of the control rod guide assemblies including:
        a guide tube having an axial dimension, the guide tube being supported by the plurality of grids and extending axially between the top nozzle and the bottom nozzle, the guide tube having an upper portion having a first external radius, a lower portion having a second external radius less than the first external radius, and a transition portion disposed between the upper portion and the lower portion, wherein the guide tube linearly transitions between the first external radius and the second external radius in the transition portion, and wherein the guide tube is monolithic through the first portion, the second portion and the transition portion; and
        an external dashpot tube disposed around a portion of the lower portion of the guide tube in an area beginning at the bottom grid and extending toward the top nozzle,
    wherein the guide tube includes at least one bulge and the external dashpot tube includes at least one bulge corresponding to the at least one bulge in the guide tube.

2. The nuclear fuel assembly of claim 1, wherein the external dashpot tube includes at least one weep hole formed therein.

3. The nuclear fuel assembly of claim 2, wherein the at least one weep hole includes a first weep hole and a second weep hole, and wherein the first weep hole is formed in an upper half of the external dashpot tube and the second weep hole is formed in a lower half of the external dashpot tube.

4. The nuclear fuel assembly of claim 1, wherein the guide tube includes a first bulge formed in its upper half and a second bulge in its lower half and the external dashpot tube includes first and second bulges corresponding to the first and second bulges of the guide tube.

5. The nuclear fuel assembly of claim 4, wherein the external dashpot tube includes at least one weep hole formed therein, and wherein the at least one weep hole is formed between the first and second bulges in the external dashpot tube.

6. The nuclear fuel assembly of claim 1, wherein the lower portion of the guide tube is substantially cylindrical and the external dashpot tube is substantially cylindrical.

7. The nuclear fuel assembly of claim 1, wherein the grids include a lower middle grid disposed second closest to the bottom nozzle among the plurality of grids, and wherein the external dashpot tube begins at the bottom grid and ends before reaching the lower middle grid.

\* \* \* \* \*